United States Patent [19]

Ulvestad et al.

[11] 4,292,057

[45] Sep. 29, 1981

[54] TOP REMOVAL SUPPORT FOR DUST COLLECTOR BAGS

[75] Inventors: Edward A. Ulvestad, Naperville; Charles M. Harris, Palatine, both of Ill.

[73] Assignee: Flex Kleen Corp., Chicago, Ill.

[21] Appl. No.: 169,641

[22] Filed: Jul. 17, 1980

Related U.S. Application Data

[63] Continuation of Ser. No. 617,710, Sep. 29, 1975, abandoned.

[51] Int. Cl.³ ............................................. B01D 46/04
[52] U.S. Cl. .................................. 55/302; 55/341 R; 55/357; 55/377; 55/379
[58] Field of Search ............. 55/302, 341 R, 374–379, 55/357

[56] References Cited

U.S. PATENT DOCUMENTS

| | | | |
|---|---|---|---|
| 1,012,122 | 12/1911 | Budil | 55/341 HMB |
| 1,847,368 | 3/1932 | Wendler | 55/379 X |
| 2,308,309 | 1/1943 | Ruemelin et al. | 55/377 |
| 2,335,315 | 11/1943 | Seymour | 55/379 X |
| 2,503,568 | 4/1950 | Timm | 55/379 X |
| 2,927,659 | 3/1960 | Pabst et al. | 55/379 X |
| 2,952,332 | 9/1960 | Metro | 55/341 NT X |
| 2,981,368 | 4/1961 | Johnson | 55/379 |
| 3,167,415 | 1/1965 | Edwards | 55/302 |
| 3,421,295 | 1/1969 | Swift et al. | 55/341 HMB |
| 3,550,359 | 12/1970 | Fisher et al. | 55/341 R |
| 3,747,305 | 7/1973 | O'Dell et al. | 55/378 X |
| 3,765,152 | 10/1973 | Pausch | 55/341 R X |
| 3,774,769 | 11/1973 | Smith | 55/376 X |
| 3,777,458 | 12/1973 | Dence | 55/379 X |
| 3,791,111 | 2/1974 | Kroll | 55/379 X |
| 3,826,066 | 7/1974 | Higgins | 55/379 |
| 3,837,151 | 9/1974 | Jensen | 55/378 X |
| 3,853,509 | 12/1974 | Leliaert | 55/379 X |
| 3,876,402 | 4/1975 | Bundy et al. | 55/379 X |

FOREIGN PATENT DOCUMENTS

| | | | |
|---|---|---|---|
| 1191078 | 4/1965 | Fed. Rep. of Germany | 55/376 |
| 242388 | 11/1925 | United Kingdom | 55/498 |
| 636439 | 4/1950 | United Kingdom | 55/374 |
| 990587 | 4/1965 | United Kingdom | 55/341 HMB |
| 1016556 | 1/1966 | United Kingdom | 55/302 |
| 1081516 | 8/1967 | United Kingdom | 55/378 |

*Primary Examiner*—Kathleen J. Prunner
*Attorney, Agent, or Firm*—Richard A. Zachar

[57] ABSTRACT

A reverse blow-back dust collector utilizes a simplified top removal support arrangement for suspending bag, cage and nozzle assemblies from a tube sheet having plain mounting openings therein. The top removal support includes a collar spot welded to the cage and disposed in force fit engagement with a top fold region of the bag which contains an expansion clamping ring assembly having spaced beads which interlock the bag in sealed relation in its corresponding tube sheet opening. The support also includes a flange which overlies and seats on the upper bead for transmitting cage loads thru the support to the top side of the tube sheet. Ease of assembly and removal affords improved installation and servicing operations.

4 Claims, 12 Drawing Figures

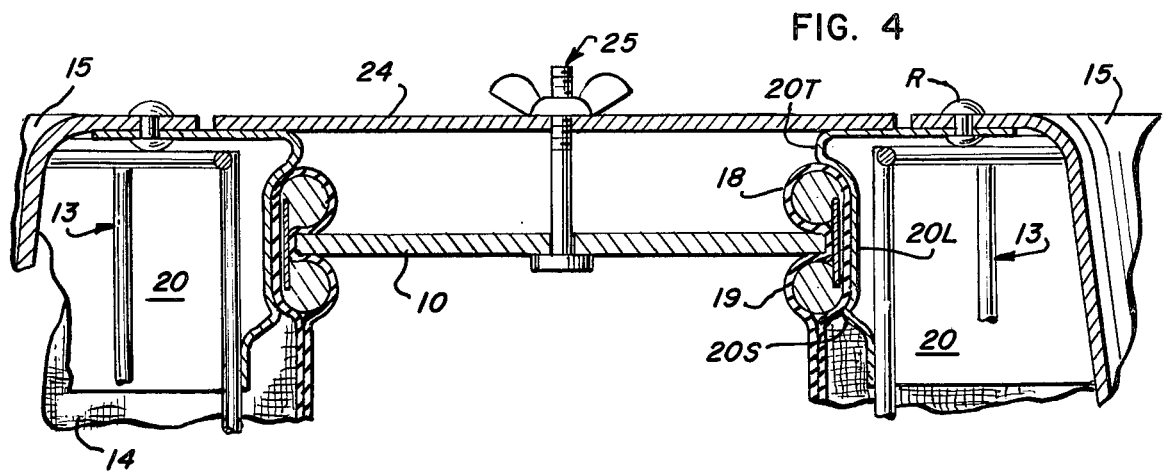
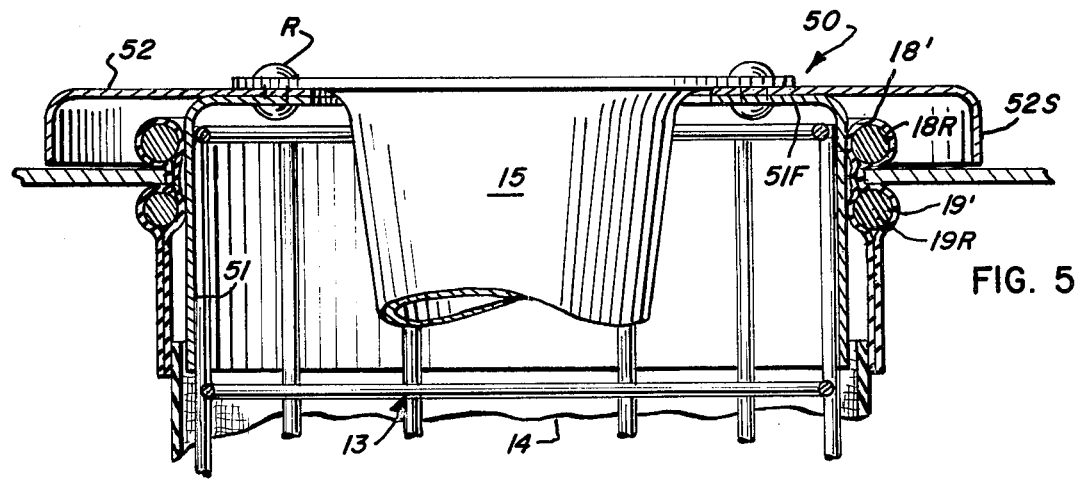
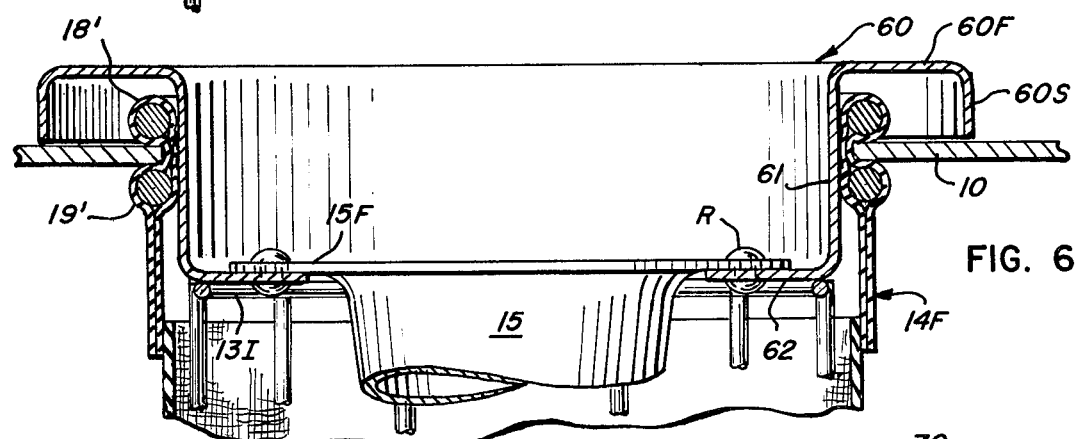
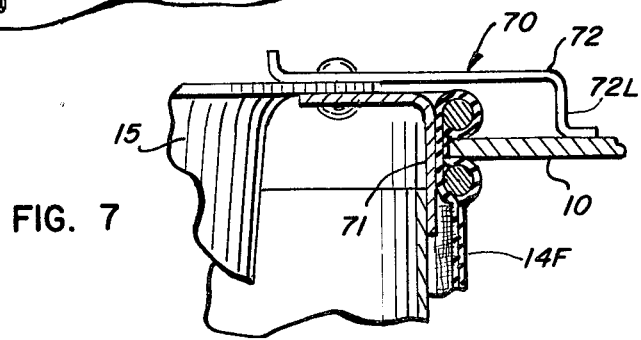

TOP REMOVAL SUPPORT FOR DUST COLLECTOR BAGS

This is a continuation of application Ser. No. 617,710, filed Sept. 29, 1975, and now abandoned.

BACKGROUND OF THE INVENTION

In a conventional reverse blow-back type of dust collector, a large number of sleeve-type filter bags are suspended from a tube sheet by means of bag cups which are individually engaged in air sealed relation to the tube sheet. In the present day commercial types of blow-back dust collectors, each bag cup carries an air nozzle which also is air sealed relative to the bag cup and the tube sheet.

In some instances, such dust collectors may incorporate as many as 500 filter bags, each having a bag cup and air nozzle assembly, each of which assemblies must be individually air sealed to the main tube sheet structure. Normally the tube sheet structure is formed in sections, each of which may carry as many as 60 bag cups, although from 4 to 32 cups per tube sheet section is typical. The tube sheet sections are welded or bolted together to lie in a common plane within the dust collector.

One of the most time-consuming and expensive fabrication operations in the manufacture of dust collectors of this type arises in connection with the mounting of each of the bag cups and air nozzles in air sealed relation to the tube sheet. In the past, this operation has been performed by welding the bag cup and air nozzle in place or by gasketing the bag cup and air nozzle in place and riveting the parts to the tube sheet.

Another time-consuming operation is involved in applying the filter bag and cage to the bag cup, usually by means of a mechanical clamping band and fastener. Bag-to-bag clearances are small and the clamping operation is tedious and difficult.

SUMMARY OF THE INVENTION

The present invention provides improved bag, cage and nozzle mounting arrangements for reverse blow-back type dust collectors for insuring the desired air sealing to the air nozzle and the tube sheet while greatly reducing the labor requirements and the cost of manufacture and servicing.

More particularly, the invention relates to reverse blow-back type dust collectors wherein each bag assembly includes an elongated skeletal cage, an elongated bag having an open end sleeve portion to receive the cage therein and an air nozzle to fit within the end of the cage.

A top removal bag assembly embodiment is disclosed for use with a flat tube sheet having plain mounting openings for the bag assemblies, the disclosed embodiment including an improved bag, cage and nozzle mounting and support arrangement comprising expansion type clamping means captively disposed within a top fold region of the bag end-sleeve portion to be detachably interlocked in its mounting opening for biasing the fold region outwardly into sealing contact with the tube sheet and top removable support structure for attachment both to the cage and to the nozzle, said support structure having shoulder means overlying the clamping means to transmit cage loads into the top side of the tube sheet, and having collar means projecting into the end-sleeve portion in force fit sealing contact with the top fold region to reinforce the tube sheet seal.

The collar means of the top removal support structure has its lower end section spot-welded to the cage and has an intermediate length section defined by vertically spaced shoulders for force fit releasable interlock within the expansion type clamping means to provide an assembly that is stable during normal operation and that is readily removable for servicing and bag replacement.

The shoulder that transmits the cage loads to the top side of the tube sheet may seat on the upper end of the top fold region or may extend laterally of the top fold and seat directly on the tube sheet.

Hold down clamps anchored in the tube sheet can also be applied to the support structure if desired.

A bail is applied to the top support structure to serve as a convenient handle for use in removing the filter mounting assemblies.

Other features and advantages of the invention will be apparent from the following description and claims and are illustrated in the accompanying drawings which show structure embodying preferred features of the present invention and the principles thereof, and what is now considered to be the best mode in which to apply these principles.

BRIEF DESCRIPTION OF DRAWINGS

In the accompanying drawings forming a part of the specification, and in which like numerals are employed to designate like parts throughout the same.

FIG. 4 is a fragmentary transverse section thru a mounted pair of adjacent bag assemblies showing an optional hold down clamp; and FIGS. 5 to 11 are transverse sections of finished assemblies of alternative embodiments of top removal bag assemblies.

DESCRIPTION OF THE PREFERRED EMBODIMENTS

Figure 1:
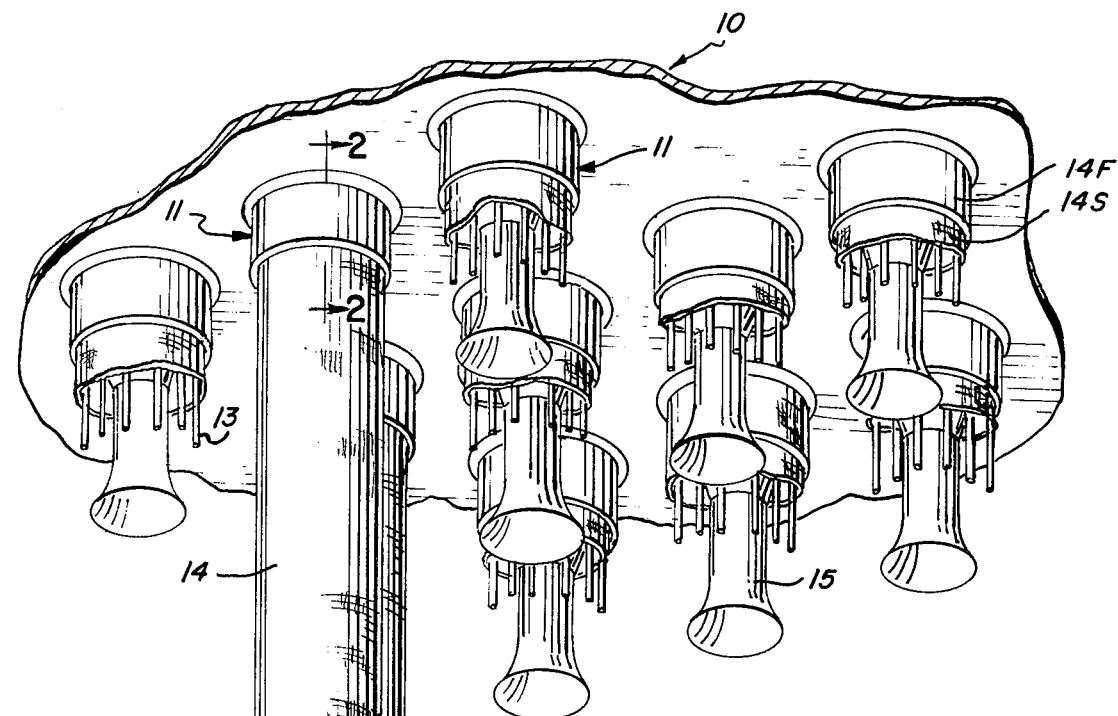
FIG. 1 is a fragmentary perspective view of a portion of a dust collector incorporating a top removal bag assembly in accordance with this invention.
Figure 2A:
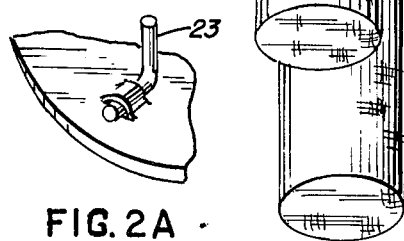
FIG. 2A is a fragmentary view illustrating an alternate bail mounting arrangement.
Figure 2:
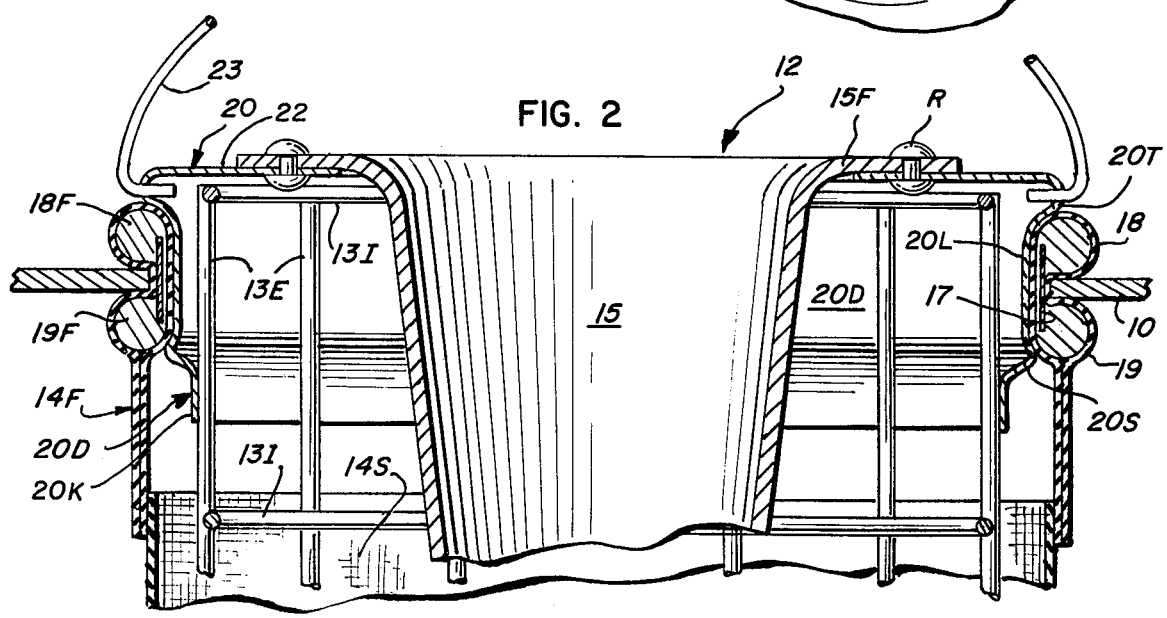
FIG. 2 is an enlarged transverse sectional view taken substantially along line 2—2 of FIG. 1.

Referring first to FIGS. 1 and 2, a portion of a perforated tube sheet 10 is illustrated with separate mounting openings for each filter unit 11. Tube sheet 10 is suitably mounted in a dust collector (not shown) and has secured thereto, in sealing relation in each mounting opening, a top removal type filter unit consisting of a suspended bag, cage and nozzle assembly 12 one of which is shown complete with the usual skeletal cage 13, a surrounding sleeve-like bag 14 suspended therefrom and a venturi-type air nozzle 15.

The cage is of any conventional elongated skeletal form and includes a set of internal wire rings 13 I interconnected by a set of circumferentially spaced lengthwise extending external wire rods 13 E. The cage 13 in FIG. 2 is shown as being substantially the same length as the bag, but it may be shorter than the bag as shown in FIG. 6 depending on the point of attachment of the cage to the top support structure 20.

The bag 14 is shown to include an open end sleeve portion 14 S of filter media fabric having a top fold region 14 F containing a captive expansion type clamping ring assembly 16 that seats in detachably interlocking relationship in the plain mounting openings of the flat tube sheet to fix the clamping ring assembly 16 against vertical movement relative to the tube sheet, with the clamping mechanism biasing the top fold region of the bag media into sealing contact with the tube sheet edge along the entire periphery of the plain mounting opening. In the illustrated embodiment the top fold region 14 F contains a circular band spring 17 of stainless steel or other suitable material adjacent its inner face and has a double bead configuration 18, 19 to define an external notch or socket for the tube sheet edge. Each bead has a fabric filling 18 F, 19 F to provide a relatively stable, resiliently biased compressible double bead fabric seal that conforms to the tube sheet edge to give a direct fabric to tube sheet seal.

The air nozzle 15 which is here shown as being of a venturi-type may be of any conventional type and includes a mounting flange 15 F bordering its top end.

A novel top removal support structure 20 is provided for attachment both to the cage 13 and to the nozzle 15. The support structure 20 as shown in FIG. 2 is of one-piece and includes a depending collar portion 20 D and a nozzle support flange portion 22. The support 20 has an enlarged annular ring portion 20 T at the juncture of the collar and flange portions and a smaller annular ring portion 20 S near the bottom of the collar, the rings 20 T, 20 S forming, respectively, support and stablizing shoulders bordering a cylindrical intermediate length section 20 L that is sized to receive the band spring 17 to establish a force fit sealing contact with the top fold region 14 F and to provide mechanical interlocks between the shoulders 20T and 20S and the band spring 17 to prevent relative vertical movement. The collar 20 D terminates in an inwardly offset depending skirt 20 K having an inside diameter (I.D.) approximately equal to the outside diameter (O.D.) defined by the lengthwise cage rods. The support shoulder 20 T extends beyond the mounting hole to overlie and seat on the top fabric bead 18 for transmitting cage loads into the top of the tube sheet.

In the arrangement shown in FIG. 2, the depending skirt 20 K at the lower end of the collar is spot-welded to the lengthwise cage rods 13 E to permanently secure these parts and the flange 22 is apertured to receive rivets R that secure the venturi mounting flange 15 F in supported position.

The top removal support structure 20 is thus permanently secured both to the cage 13 and to the nozzle 15 to support their weight from the top side of the tube sheet.

Thus, the sleeve portion 14S with its top fold region 14F together with circular band spring 17 and fabric beads 18 and 19 define tube sheet sealing means which is reinforced by the intermediate length section 20L of the collar portion 20D of the support structure 20.

Alternative forms of pivoted bails 23, as shown in FIGS. 2 and 2A, may be applied to the top of the support structure 20 to serve as a convenient handle for lifting the support structure out of its force fit engagement with the top fold region of the bag.

The illustrated construction facilitates assembly and removal of the filter bag units while assuring an effective seal. This is important both to initial installation and to periodic servicing operations.

Figure 3:
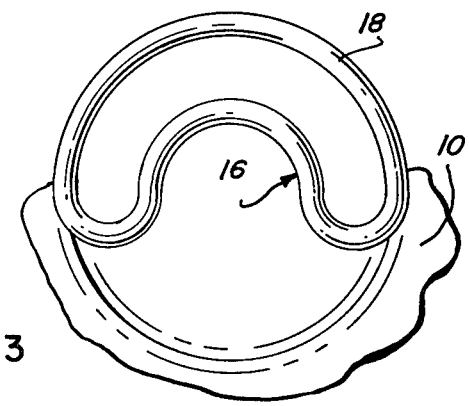
FIG. 3 is a fragmentary plan view showing the assembly of the bag into the tube sheet.

The installation steps for applying the top removal bag, cage and nozzle assemblies of this invention are as follows:

(1) feed the bottom end of the bag 14 thru the tube sheet opening;
(2) collapse the expansion clamping means 16 as shown in FIG. 3 and lower the bag until the notch between the upper and lower beads 18, 19 lines up with the tube sheet edge and snaps into place as suggested by phantom lines in FIG. 3;
(3) lower the cage 13 together with the nozzle 15 and pre-welded top support structure 20 into the bag; and
(4) push the top support structure 20 down to force fit the collar 20 D into the top fold 14 F until the band spring 17 seats between the shoulders or rings 20 T, 20 S and the upper shoulder 20 T seats on the top bead 18.

In assembled position, the parts are interlocked in stable relationship, with the top fold being biased outwardly by the captive expansion clamping means and by the force fit seating of the collar 20 D therein to provide a direct collar to fabric seal and a direct fabric to tube sheet seal and with the cage loads being transmitted thru the support structure to the top side of the tube sheet.

Where desired, the removable supports 20 of adjacent assemblies may be clamped in place under positive pressure as shown in FIG. 4 wherein a bar 24 is shown bridged across adjacent edges of the annular flanges 22. The bar 24 is clamped in place by means of a wing-nut fastener assembly 25 having a resistance welded stud anchored in the interbag tube sheet regions. The bar 24 applies positive hold down forces to reinforce the engagement of the top shoulders 20 T of the support structures against the upper beads 18 of the top fold regions of the bags.

Modified embodiments of top removal support structures are shown in FIGS. 5, 6 and 7. In each of these embodiments, the top fold region of the bag is shown as having an expansion type clamping arrangement consisting of an upper fabric bead 18' encasing an upper spring metal ring 18 R and a lower fabric bead 19' encasing a lower spring metal ring 19 R. The pairs of metal rings define a double bead configuration having a notch for receiving the tube sheet edge in a direct fabric-to-metal seal relationship. The clamping arrangement can be interchanged with the band type shown in FIG. 2.

In the embodiment of FIG. 5, the support structure 50 is fabricated in two separate pieces, a collar 51 for force fit sealed engagement within the top fold region and an annular top support flange 52. The collar has an annular top flange 51 F underlying the top support flange 52 and secured in assembled relation thereto and to the venturi 15 by a set of rivets R. The main length of the collar telescopes over the cage and is spot-welded to the lengthwise cage rods 13 E similarly to the FIG. 2 embodiment. The top flange 52 extends beyond the mounting hole in spaced relation over the upper fabric bead 18' and includes an integrally depending outer skirt 52 S functioning as a shoulder means that directly contacts the tube sheet to transmit the weight of the cage and venturi to the top side of the tube sheet. In this form, direct fabric-to-metal seals are provided between the exterior of the top fold and the tube sheet edge and between the interior of the top fold and force fit collar.

The embodiment of FIG. 6 uses a one-piece support structure 60 having a collar portion 61 for force fit sealing with the top fold of the bag and a flange portion 60 F that extends beyond the mounting hole and includes a depending skirt 60 S that seats on the top of the tube sheet 10 to function as a shoulder means that directly contacts the tube sheet to transmit the cage loads. The collar 61 has an integral bottom flange 62 that is butt-welded to the top cage ring 13 I and that is apertured to be connected to the flange 15 F of the venturi 15 by means of rivets R.

FIG. 7 shows an arrangement similar to FIG. 5, but wherein the support structure 70 is of multiple pieces. The collar 71 may be identical to the collar 51 but the top support flange consists of a set of radial arms 72 each terminating in a depending leg 72 L that directly contacts the tube sheet 10.

The overall arrangement of each of the embodiments shown in FIGS. 8 to 11 is generally similar to that of FIG. 5, but in FIGS. 8 to 11, the complete assembly is shown on the right hand side while only the support structure is shown on the left hand side.

In addition, the clamping ring assembly 16 as shown in FIGS. 8 to 11 is similar to that of FIG. 2 instead of that of FIG. 5. Pivoted bails may be used on any of these embodiments.

Figure 8:
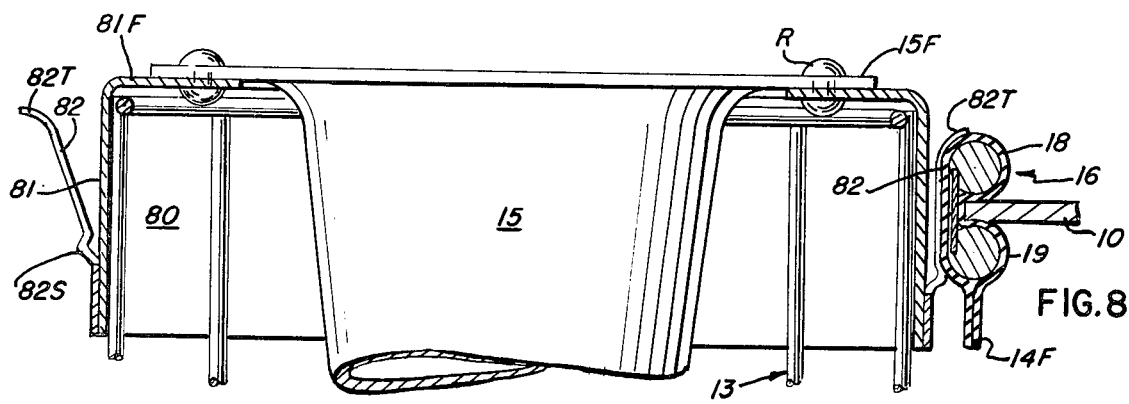

In the embodiment of FIG. 8, the support structure 80 is fabricated in separate pieces in that it includes the force fit cylindrical collar 81 that includes an integral top flange 81 F for connection to the venturi flange 15 F and a set of four support springs 82 that are spot-welded to the collar 81. Each of the springs has an outward tab 82 T at the top to function as a support shoulder engageable with the upper bead and an intermediate kink 82 S to function as a stabilizing shoulder engageable with the lower bead. The support springs 82 normally flare outwardly from the collar as shown at the left, but during force fit insertion can swing to substantially parallel position as shown at the right. The spring action of this arrangement accommodates filter fabrics of various gauge thicknesses, thus simplifying maintenance.

Figure 9:
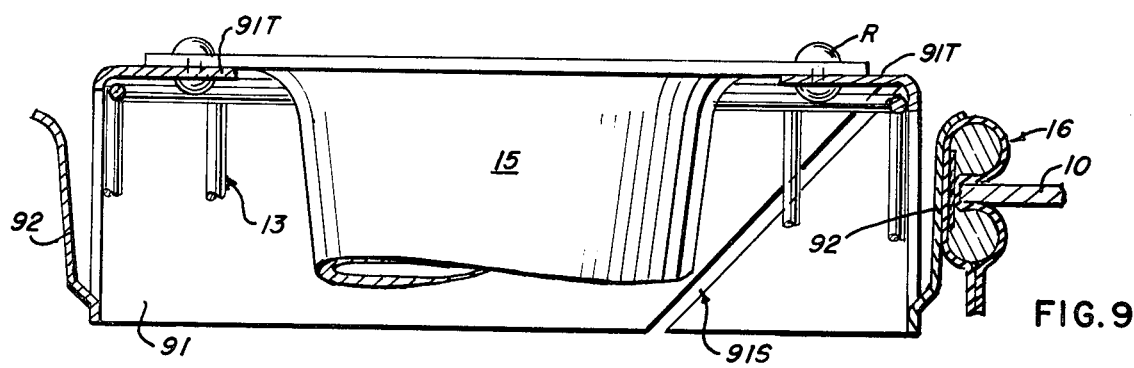

The embodiment of FIG. 9 is similar to that of FIG. 8 except that the support springs 92 are in the form of integral fingers struck out from the side wall of the collar 91. In addition, the collar 91 is arranged so that it is fabricated by being rolled from strip stock. Thus, the side wall has a diagonal slot 91 S in its finished form and the top flange is in the form of circularly spaced integral tabs 91 T for connection to the venturi flange.

Figure 10:
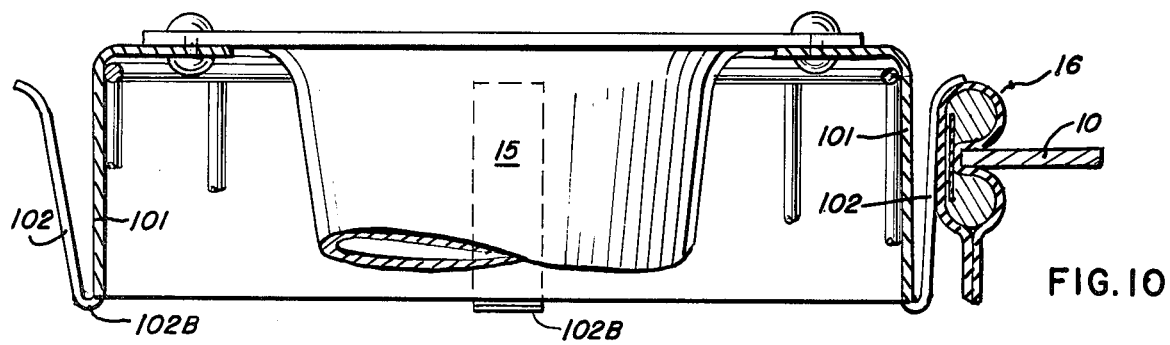

Another embodiment utilizing support springs 102 in the form of integral fingers connected through reverse bend portions 102 B to the lower edge of the collar 101 is shown in FIG. 10.

Figure 11:
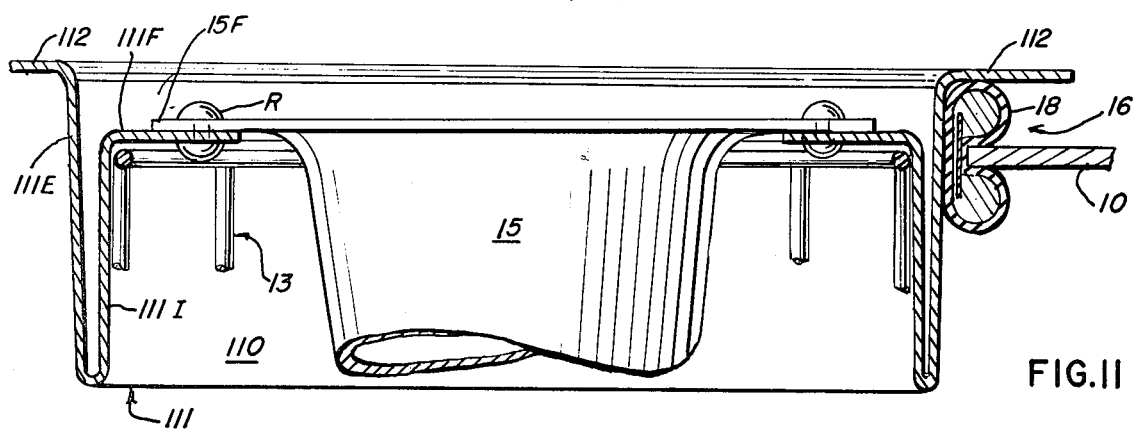

Finally, in the embodiment of FIG. 11, a one-piece support structure 110 is shown as including a collar 111 having an external cylindrical wall 111 E for force fit engagement in the clamping ring assembly 16 and an internal cyclindrical wall 111 I for securement to the cage. The internal wall 111 I also includes an integral top flange 111 F for connection to the venturi flange 15 F. The external wall 111 E includes a top support flange 112 that overlies and seats upon the fabric covered upper bead when the collar section is force fit into place.

It should be noted that the disclosed top removal support arrangements offer a number of practical advantages including: rapid installation; uniform tight seal directly to the tube sheet; no tools required for initial installation or for servicing and maintenance; no bag clamps required; and easy clean-up and maintenance of the unit because of the flat tube sheet and because all operations can be performed from the clean side.

Thus, while preferred constructional features of the invention are embodied in the structure illustrated herein, it is to be understood that changes and variations may be made by those skilled in the art without departing from the spirt and scope of the appended claims.

What is claimed is:

1. In a reverse blow-back dust collector that includes a flat tube sheet having a plurality of closely spaced plain mounting openings, and a separate bag assembly for each mounting opening, each bag assembly including an elongated skeletal cage, an elongated bag having an open end portion to receive the cage therein, and an air nozzle to fit within the end of the cage, the improvement comprising an improved cage and nozzle mounting and support arrangement for each bag assembly comprising tube sheet sealing means including a sleeve of fabric material having a top fold region, an expansion type clamping means captively disposed within said top fold region for biasing said top fold region outwardly into direct sealing contact with the edge portion of one of said openings of said tube sheet and having upper and lower circular beads of soft resilient material in pressed engagement with said tube sheet above and below the same, and a removable top support structure projecting through said one of said openings and through said sleeve and supporting said cage and said nozzle to extend generally below said tube sheet, said support structure including a flange portion presenting a substantially flat horizontal surface having an opening therethrough, a vertical collar portion for force fit seal reinforcing engagement with said top fold region, and a shoulder portion overlying said edge portion and said upper bead to transmit cage loads through said bead and onto the top side of said tube sheet, said nozzle being affixed to said flange portion and extending downwardly through the opening thereof.

2. In a reverse blow-back dust collector in accordance with claim 1 wherein said top support structure includes a second shoulder portion spaced from said first mentioned shoulder portion to interlock with said top fold region of said tube sheet sealing means to fix said support arrangement against vertical movement.

3. In a reverse blow-back dust collector in accordance with claim 1 and further including a pivoted bail connected to the support structure to facilitate lifting of the same from force-fit engagement with said tube sheet sealing means.

4. In a reverse blow-back dust collector in accordance with claim 1 wherein said sleeve of fabric material is connected to the open end portion of the bag.

* * * * *